United States Patent

[11] 3,522,819

[72] Inventors: Benjamin P. Bell
Libertyville, Illinois;
Hugh H. Roberts, Lakeland, Florida
[21] Application No.: 779,136
[22] Filed: Nov. 26, 1968
[45] Patented: Aug. 4, 1970
Division of Ser. No. 450,341, Apr. 23, 1965, now Pat. No. 3,437,452, Apr. 8, 1969.
[73] Assignee: International Minerals & Chemicals Corporation a Corp. of New York

[54] APPARATUS FOR SAMPLING SOLIDS-CONTAINING SOLUTIONS
5 Claims, 4 Drawing Figs.
[52] U.S. Cl. .................................................. 137/544, 137/566
[51] Int. Cl. .................................................. E03f 5/00, B01d 11/00

[50] Field of Search ........................................ 73/161, 422; 23/165, 253, 267, 272.7, 309, 311, 312; 259/18, 36, 94, 95; 137/544, 550, 566; 210/416

[56] References Cited
FOREIGN PATENTS
1,058,281 5/1959 Germany 73/61
Primary Examiner— Henry T. Klinksiek
Attorney—James E. Wolber and Peter Andress ABSTRACT: An apparatus for removing a diluted sample of solution from a body containing the solution and undissolved solid material including a sampler body having a cavity communicating through a filter with the surrounding area to admit liquid into the cavity when it is positioned before the surface of a solution, first means for introducing a continuous stream of a diluent liquid into the cavity, and second means for withdrawing a continuous stream of diluted liquid out of the cavity at a rate of flow greater than the rate at which the diluent liquid is introduced through the first means.

Patented Aug. 4, 1970

3,522,819

INVENTORS
Benjamin P. Bell,
Hugh H. Roberts

BY

ATTORNEY

U.S. PATENT 3,522,819
APPARATUS FOR SAMPLING SOLIDS-CONTAINING SOLUTIONS

CASE REFERENCE TO RELATED APPLICATION

This is a division of application Ser. No. 450,341, filed Apr. 23, 1965; now U.S. Pat. No. 3,437,452.

BACKGROUND OF THE INVENTION

This invention relates to the sampling of solutions and more particularly to the removal from a body containing a solution and undissolved solid material of a diluted sample of such controlled concentration as to prevent precipitation of solids in the sampling lines.

In various leaching and similar processes, it is essential for control purposes to remove samples of clear liquor for chemical analysis or other testing. Frequently the liquid to be sampled is contained in a supersaturated state in a slurry. Even though the sample may be filtered to a clear state when separated from the slurry, precipitation of solids in the sampling lines causes clogging and complicates analysis techniques. For example, in the wet process manufacture of phosphoric acid, naturally occurring phosphate rock is contacted with sulfuric acid to form a slurry of phosphoric acid and gypsum crystals. The hot slurry liquid is supersaturated with various solids in solution. For example, substantial quantities of fluosilicates may be in solution consequent from the presence of fluorine and silica in the phosphate.

Continuous control of the process requires frequent sampling of the slurry liquor for chemical analysis. It has been difficult, employing heretofore available techniques, to remove a sample of such controlled dilution as to prevent post filtration precipitation of solids in the sampling line.

SUMMARY OF THE INVENTION

To overcome the disadvantages of the prior art it is an object of the present invention to provide an improved method and apparatus for extracting clear samples of solution from a body containing the solution and undissolved solid material.

A further object of the invention is to provide such a method and apparatus wherein a sample may be taken from a supersaturated solution, diluted and maintained in a controlled subsaturation concentration which precludes precipitation of solids in the sampling lines.

Broadly the invention relates to an apparatus for removing a diluted sample of solution from a body containing the solution and undissolved solid material which comprises a sampler body adapted to be positioned below the surface of the solution to be sampled, said sampler body having a cavity in communication with the surrounding area to admit liquid into said cavity, filter means separating said cavity from the surrounding area to exclude solid material from said cavity, first and second conduits connected in fluid communication with said cavity, a first positive displacement pump connected to said first conduit to direct a diluent liquid toward said sampler body, a second positive displacement pump connected to said second conduit to direct diluted liquid away from said sampler body, and power means to drive said pumps to produce in said second pump an output proportional to and sufficiently greater than the output of said first pump to maintain said diluted slurry liquid at a controlled subsaturation concentration to prevent post filtration precipitation of solids.

BRIEF DESCRIPTION OF THE DRAWINGS

The invention having been generally described, a preferred specific embodiment will be set forth in connection with the accompanying drawings in which.

DESCRIPTION OF THE PREFERRED EMBODIMENTS

Figure 1:
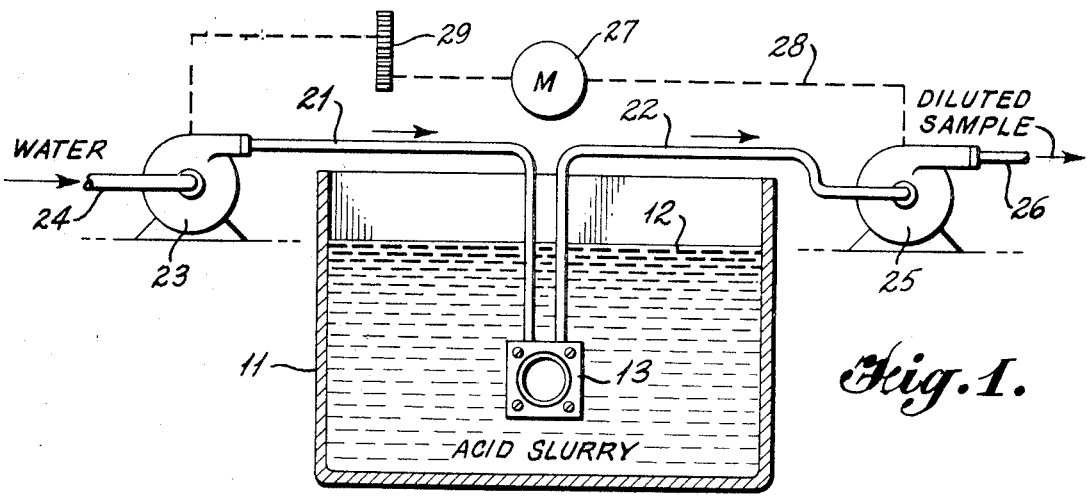
FIGURE 1 is a schematic sectional elevation depicting a sampling apparatus according to the invention.
Figure 2:
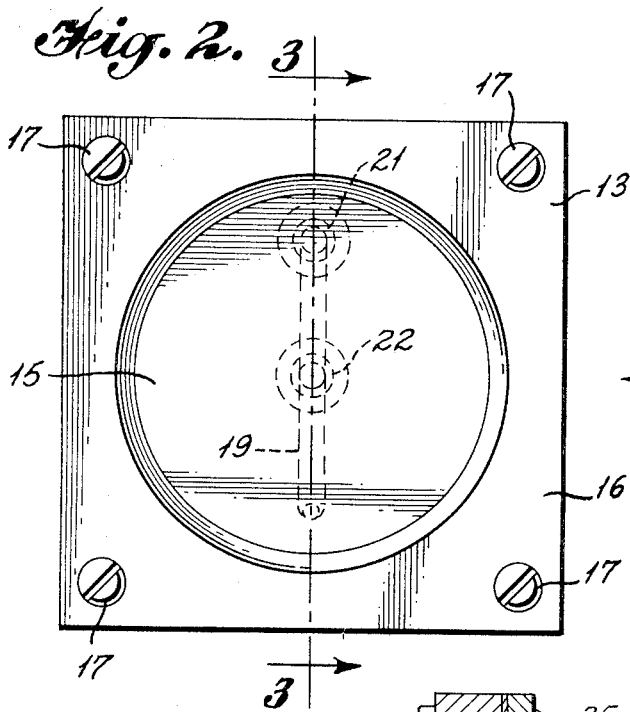
FIGURE 2 is an elevation of the sampler body.

Shown in FIGURE 1 is a tank 11 containing a body 12 of liquid and solid material. Some of the solid material is undissolved and the remainder is in solution in the liquid. More specifically, the tank 11 contains a hot acid slurry formed in the production of phosphoric acid by contacting phosphate rock with sulfuric acid. While the invention is particularly useful in connection with the sampling of such a slurry, it is not so limited.

Typically the acid slurry in the tank 11 contains gypsum crystals and various other solids depending upon the impurities found in the phosphate rock. For example, the presence of fluorine and silica in the rock will result in the presence in solution of substantial amounts of fluosilicates.

Submerged in the slurry 12 is a sampler body 13 which comprises a block of metal or other suitable material. The sampler body 13 contains a cavity 14 which is exposed to the surrounding area to admit the slurry liquid into the cavity. Extending across the mouth of the cavity 14 to separate the cavity from the surrounding area is a filter cloth 15 held in place by a ring 16 connected to the sampler block by bolts 17. The filter cloth 15 should have a reasonably large effective area to permit long periods of operation before it is necessary to clean the cloth. The mesh size of the cloth is selected in accordance with the size of solids in the slurry. For example, the cloth might be capable of retaining only plus 500 mesh material. In certain instances the filter might be so fine as to approach a semipermeable membrane.

The sides of the cavity 14 are defined by the spacer ring 18. Alternatively the sampler block may be a single cup shaped body. Extending through the sampler body 13 is a passageway 19 one end of which communicates with the cavity 14. The other end of the passageway 19 communicates with a pair of conduits 21 and 22 which are connected to the sampler body 13.

The outer end of the conduit 21 is connected to the outlet side of a positive displacement pump 23 which in turn has an inlet line 24 connected to a source of water not shown. The outer end of the conduit 22 is connected to the inlet side of a second positive displacement pump 25 which has an outlet line 26 through which the diluted sample is delivered to a desired location for chemical analysis or other testing.

Preferably the pumps 23 and 25 are driven by a common motor 27. The pump 25 is driven at a greater speed than the pump 23 to provide a predetermined differential between the rates of flow through the respective pumps for a purpose explained more fully hereinafter. The motor 27 may drive the pump 25 through a directly connected drive shaft 28 and may drive the pump 23 through a gear reduction transmission 29. Other means may be employed to impart a controlled differential displacement between the pumps 23 and 25.

For example, the pumps may be driven by separate motors with different outputs, but this arrangement diminishes the close control over the differential capacities of the pumps which is characteristic of a common drive. Further, the pumps may be driven at the same speed but have differing displacements at such speed. One or both of the pumps may be characterized by adjustable displacement. However, during any particular sampling operation the differential displacement between the pumps should be fixed and constant.

Water is moved by the pump 23 through the conduit 21 into sampler body 13. Liquor from the slurry in the tank 11 is withdrawn from the sampler body 13 through the conduit 22 by the pump 25. Since the rate of flow through the pump 25 is greater than the rate of flow through the pump 23 the differential is made up by a flow of the filtered slurry liquid through the filter 15 into the cavity 14. From the latter the filtered slurry liquid flows through the passageway 19 into the conduit 22 where it is combined with the diluting water to provide a diluted sample which is removed by the pump 25.

The differential between the rate of flow through the pump 25 and the rate of flow through the pump 23 is preselected to achieve the desired controlled dilution of the sample. This dilution is such as to maintain a subsaturation concentration to prevent post filtration precipitation of any of the solid materials which are in solution in the diluted sample.

The pumps 23 and 25 should be positive displacement pumps to insure the proper control of the rate of flow through each pump. Where a constant differential in rate of flow is maintained between the two pumps the flow of slurry liquid through the filter 15 is independent of the head of liquid above the sampler body 13. Thus the flow of the diluted sample through the line 26 is also independent of the head.

Figure 4:
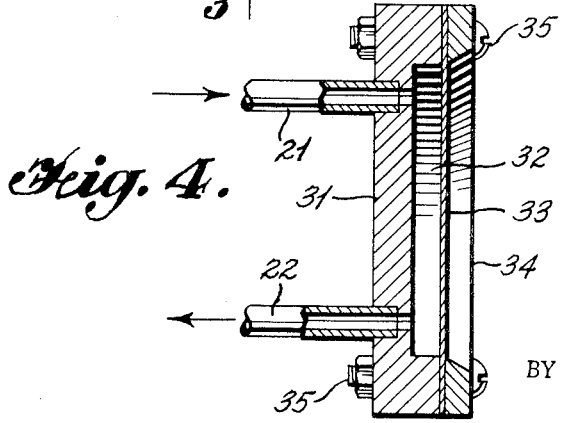
FIGURE 4 is a vertical section similar to FIGURE 3 of a modified form of sampler body.

Depicted in FIGURE 4 is an alternative form of sampler body which may be employed. In such embodiment a cup shaped body 31 contains a cavity 32 covered by a filter cloth 33 which in turn is retained against the body 31 by a clamping ring 34 and a plurality of bolts 35. The significant difference between the sampler body 31 and the sampler body 13 resides in the differing connection of the conduits 21 and 22 to the cavity within each sampler body. In the modified device 31 the conduits 21 and 22 are separately connected to the cavity 32. In the device 13 the conduits 21 and 22 communicate with each other at a location spaced from the cavity 14. Each of the conduits communicates with the cavity 14 by a common passageway 19.

Figure 3:
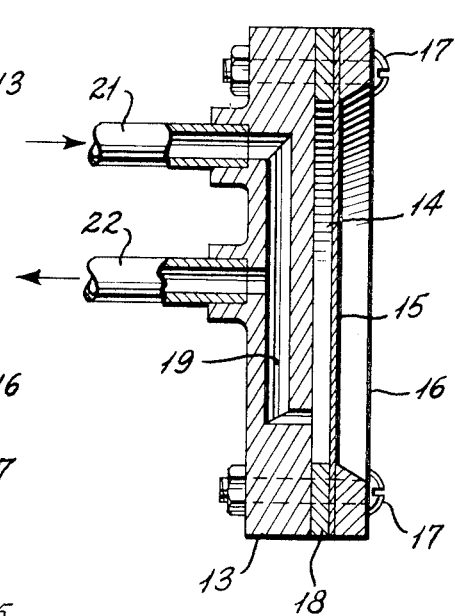
FIGURE 3 is a vertical section taken along the line 3-3 of FIGURE 2.

The modification shown in FIGURE 3 is preferred because there is less danger of loss of diluting water outwardly through the filter cloth 33 into the surrounding slurry. Diluting water entering the sample 13 through the conduit 21 will pass immediately into the conduit 22 without reaching the cavity 14. The water will not flow counter to the flow in the passageway 19 of the filtered sample from the cavity 14.

We claim:

1. An apparatus for removing a diluted sample of solution from a body containing the solution and undissolved solid material which comprises a sampler body adapted to be positioned below the surface of the solution to be sampled, said sampler body having a cavity in communication with the surrounding area to admit liquid into said cavity, filter means separating said cavity from the surrounding area to exclude solid material from said cavity, first and second conduit means connected in fluid communication with said cavity, a first positive displacement pump connected to said first conduit to direct a diluent liquid toward said sampler body, a second position displacement pump connected to said second conduit to direct diluted liquid away from said sampler body, and power means to simultaneously drive said pumps while said pumps are in fluid communication with said cavity to produce in said second pump an output proportional to and sufficiently greater than the output of said first pump to maintain said diluted liquid at a controlled subsaturation concentration free of post filtration precipitation and to preclude passage of any of the introduced stream of diluent liquid through said filter into the surrounding solution.

2. An apparatus as recited in Claim 1 wherein said first and second conduit means communicate with each other at a location spaced from said cavity.

3. An apparatus as recited in Claim 2 wherein said first and second conduit means are connected to said cavity by a single passageway.

4. An apparatus as recited in Claim 3 wherein said sampler body has a passageway therein connected at one end to said cavity and at the other end to said conduit means.

5. An apparatus as recited in Claim 1 wherein said conduit means are separately connected to said cavity.